US006743863B2

(12) United States Patent
Iizuka et al.

(10) Patent No.: US 6,743,863 B2
(45) Date of Patent: Jun. 1, 2004

(54) RESIN COMPOSITION COMPRISING ETHYLENE-BASED POLYMERS AND PROCESS FOR ITS PRODUCTION

(75) Inventors: Tetsuya Iizuka, Chiba (JP); Shigeharu Yamamoto, Chiba (JP); Masao Kawahara, Chiba (JP); Toshifumi Takemori, Chiba (JP); Masashi Iida, Chiba (JP); Katsutoshi Nishitani, Chiba (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 47 days.

(21) Appl. No.: 10/209,935

(22) Filed: Aug. 2, 2002

(65) Prior Publication Data

US 2003/0036606 A1 Feb. 20, 2003

(30) Foreign Application Priority Data

Aug. 7, 2001 (JP) ........................................ 2001-239836

(51) Int. Cl.⁷ .......................... C08L 23/00; C08L 23/04; C08F 8/00
(52) U.S. Cl. .................. 525/191; 525/192; 525/193; 525/197; 525/240
(58) Field of Search ................................ 525/191, 192, 525/193, 197, 240

(56) References Cited

U.S. PATENT DOCUMENTS 4,550,143 A * 10/1985 Tanaka et al. .............. 525/240
4,835,219 A *  5/1989 Tajima et al. .............. 525/240

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A resin composition comprising the following components (A), (B) and (C), wherein the content of component (A) is from 10 to 90 wt %, component (B):component (C)=from 10:1 to 1:5 (weight ratio), the intrinsic viscosity [η] is in the range from 0.17 to 0.40 m³/kg, and the density is in the range from 935 to 968 kg/m³:

Component (A): a homopolymer of ethylene or a copolymer of ethylene having an α-olefin content of from 0 to 0.5 wt %, and an intrinsic viscosity [η] of from 0.035 to 0.17 m³/kg, Component (B): a homopolymer of ethylene or a copolymer of ethylene having an α-olefin content of from 0 to 0.5 wt %, and an intrinsic viscosity [η] of from 0.2 to 1.0 m³/kg, and Component (C): a copolymer of ethylene having an α-olefin content of from 0.7 to 15 wt %, and an intrinsic viscosity [η] of from 0.2 to 1.0 m³/kg.

7 Claims, No Drawings

RESIN COMPOSITION COMPRISING ETHYLENE-BASED POLYMERS AND PROCESS FOR ITS PRODUCTION

BACKGROUND OF THE INVENTION

1. Field of the Invention

The present invention relates to a resin composition comprising ethylene-based polymers excellent in environmental stress cracking resistance (hereinafter referred to as ESCR) and stiffness without imperfections or gel, excellent in moldability, and suitable for blow molding to produce e.g. cans and bottles, and for extrusion molding to produce pipes, and a process for its production.

2. Discussion of Background

In recent years, higher performance has become required for polyethylene as its application and demand increases. For example, physical properties required for polyethylene for blow molding or for extrusion molding may be good ESCR, high stiffness due to high density, good moldability, etc.

Generally speaking, the polyethylene having lower density, or higher intrinsic viscosity and higher molecular weight leads better ESCR property of the resin composition. However, when the value of polymer density is lowered, the mechanical strength of the composition is lowered as well as stiffness. When the polyethylene has high value of intrinsic viscosity or high molecular weight, the composition is poorly flowable to cause the problem of molding. Thus, improving ESCR of the resin composition in control of the density of the polymers and increasing the stiffness of resin composition, are against each other. Likewise, improving ESCR of the composition in control of the molecular weight of the polymers and improving the moldability of the composition, are against each other.

Heretofore, as a method of producing a polyethylene having a broad molecular weight distribution to be used for blow molding, a method of producing a polyethylene having a high molecular weight and a polyethylene having a low molecular weight in more than two consecutive polymerization steps has been considered, and various methods have been proposed as multi-step polymerization methods. Generally speaking, a polyethylene obtained by a two-step polymerization method is excellent in the balance of stiffness and ESCR, as compared with a polyethylene obtained by a single step polymerization method. For example, according to the method described in JP-A-64-79204 or JP-A-2-155906, it is disclosed that an α-olefin is copolymerized in order to control the stiffness of the polyethylene, and the balance between the stiffness and environmental stress cracking resistance (ESCR) can be remarkably improved by incorporating the α-olefin so that the content of the α-olefin in the higher molecular weight polymer is higher than the content of the α-olefin in the lower molecular weight polymer.

However, the product obtained by such a two-step polymerization method has disadvantages that generally, the bonding strength at a pinch-off portion of the blow molded articles is small, and the swelling ratio is small. As a means to overcome such disadvantages of the two-step polymerization method, a three-step polymerization method has been proposed in, for example, JP-A-58-138719, JP-A-59-227913, JP-A-64-79204, JP-B-59-10724, JP-B-62-61057, JP-B-3-29805 and JP-B-4-14686. In the method described in these publications, three components having different molecular weights are produced in each step. However, as pointed out in JP-B-4-14686, there is a problem that the balance of stiffness and ESCR tends to be poor, although the swelling ratio of the obtained polyethylene can be improved. Further, in the three-step polymerization method as proposed by such prior art, generally in addition to the lower molecular weight component and the high molecular weight component produced by normal two-step polymerization, a small amount of an ultrahigh molecular weight component is produced as a third component, and consequently, a polyethylene containing a small amount of a polymer having such a very high molecular weight tends to form imperfections or gel.

SUMMARY OF THE INVENTION

Therefore, it is an object of the present invention to provide a resin composition comprising ethylene-based polymers excellent in ESCR and stiffness without imperfections or gel, and excellent in moldability, and a process for producing such a resin composition.

The present inventors have conducted extensive studies to solve the above-mentioned difficult problems and establish a resin composition comprising ethylene-based polymers suitable for blow molding or extrusion molding, and a process for its production, and, as a result, have found that by combining three types of polymers having specific structures which are not ultrahigh molecular weight components, at specific contents, and further by setting the difference in molecular weight (evaluated by an intrinsic viscosity) between component (B) and component (C) among the three types not to be so large, and differentiating the contents of α-olefins in the two components, all of the above-mentioned requirements can be satisfied and the object of the present invention can be realized. The present invention has been accomplished on the basis of these discoveries.

Thus, the present invention provides a resin composition comprising the following components (A), (B) and (C), wherein the content of component (A) is from 10 to 90 wt %, component (B):component (C)=from 10:1 to 1:5 (weight ratio), the intrinsic viscosity [η] is in the range from 0.17 to 0.40 m$^3$/kg, and the density is in the range from 935 to 968 kg/m$^3$:

Component (A): a homopolymer of ethylene or a copolymer of ethylene having an α-olefin content of from 0 to 0.5 wt %, and an intrinsic viscosity [η] of from 0.035 to 0.17 m$^3$/kg, Component (B): a homopolymer of ethylene or a copolymer of ethylene having an α-olefin content of from 0 to 0.5 wt %, and an intrinsic viscosity [η] of from 0.2 to 1.0 m$^3$/kg, and Component (C): a copolymer of ethylene having an α-olefin content of from 0.7 to 15 wt %, and an intrinsic viscosity [η] of from 0.2 to 1.0 m$^3$/kg.

The present invention also provides a process for producing a resin composition comprising ethylene-based polymers, which comprises carrying out step (a): a step of producing from 10 to 90 wt %, based on the total amount of polymerized polymers, of a homopolymer of ethylene or a copolymer of ethylene having an α-olefin content of from 0 to 0.5 wt %, and an intrinsic viscosity [η] of from 0.035 to 0.17 m$^3$/kg, at a temperature of from 70 to 110° C., step (b): a step of producing a homopolymer of ethylene or a copolymer of ethylene having an α-olefin content of from 0 to 0.5 wt %, and an intrinsic viscosity [η] of from 0.2 to 1.0 m$^3$/kg, at a temperature of from 40 to 90° C., and step (c): a step of producing a copolymer of ethylene having an α-olefin content of from 0.7 to 15 wt %, and an intrinsic viscosity [η] of from 0.2 to 1.0 m³/kg, at a temperature of from 30 to 80° C., in an optional order, by using a catalyst which comprises a solid catalyst component (E) containing at least titanium, magnesium and a halogen, and an organic aluminum compound, wherein the three-step polymerization is carried out so that the ratio of amount of polymerized polymers in steps (b) and (c) becomes step (b):step (c)=from 10:1 to 1:5 (weight ratio), to produce a resin composition having an intrinsic viscosity [η] of from 0.17 to 0.4 m³/kg and a density of from 935 to 968 kg/m³.

The present invention further provides a process for producing a resin composition comprising ethylene-based polymers, which comprises carrying out step (a): a step of producing from 10 to 90 wt %, based on the total amount of polymerized polymers, of a homopolymer of ethylene or a copolymer of ethylene having an α-olefin content of from 0 to 0.5 wt %, and an intrinsic viscosity [η] of from 0.035 to 0.17 m³/kg, at a temperature of from 70 to 100° C., step (b): a step of producing a homopolymer of ethylene or a copolymer of ethylene having an α-olefin content of from 0 to 0.5 wt %, and an intrinsic viscosity [η] of from 0.2 to 1.0 m³/kg, at a temperature of from 40 to 90° C., step (c): a step of producing a copolymer of ethylene having an α-olefin content of from 0.7 to 15 wt %, and an intrinsic viscosity [η] of from 0.2 to 1.0 m³/kg, at a temperature of from 30 to 80° C., in an optional order, by using a catalyst which comprises a solid catalyst component (F) containing a metallocene compound and an aluminoxane, and an organic aluminum compound, wherein the three-step polymerization is carried out so that the ratio of amount of polymerized polymers in steps (b) and (c) becomes step (b):step (c)=from 10:1 to 1:5 (weight ratio), to produce a resin composition having an intrinsic viscosity [η] of from 0.17 to 0.4 m³/kg and a density of from 935 to 968 kg/m³.

Now, the present invention will be described in detail with reference to the preferred embodiments.

The α-olefin as a comonomer for the copolymer of ethylene constituting the resin composition comprising ethylene-based polymers of the present invention, means an α-olefin other than ethylene. As such an α-olefin, one having from 4 to 20 carbons is preferably used. Particularly, 1-butene, 1-pentene, 4-methyl-1-pentene, 1-hexene, 1-octene, 1-decene, 1-dodecene or 1-icocene, may, for example, be mentioned. Among these, 1-butene, 1-hexene and 1-octene are particularly preferred.

The resin composition comprising ethylene-based polymers of the present invention comprises three components (A), (B) and (C). Among them, component (A) is a homopolymer of ethylene or a copolymer of ethylene having an α-olefin content of from 0 to 0.5 wt % and an intrinsic viscosity [η] of from 0.035 to 0.17 m³/kg. It is preferably a homopolymer of ethylene or a copolymer of ethylene having an α-olefin content of from 0 to 0.3 wt % and an intrinsic viscosity [η] of from 0.04 to 0.15 m³/kg. When the content of the α-olefin in component (A) exceeds 0.5 wt %, the stiffness and ESCR of the resin composition tend to be low. And, when the intrinsic viscosity [η] is less than 0.035 m³/kg, the bonding strength at a pinch-off portion of the blow molded articles tends to be insufficient, and if it exceeds 0.17 m³/kg, ESCR of the composition tends to be low.

Component (B) of the resin composition is a homopolymer of ethylene or a copolymer of ethylene having an α-olefin content of from 0 to 0.5 wt % and an intrinsic viscosity [η] of from 0.2 to 1.0 m³/kg. Preferably, it is a homopolymer of ethylene or a copolymer of ethylene having an α-olefin content of from 0 to 0.3 wt % and an intrinsic viscosity [η] of from 0.25 to 0.8 m³/kg. In component (B), when the α-olefin content exceeds 0.5 wt %, the stiffness and ESCR of the resin composition tends to be low. Further, when the intrinsic viscosity [η] of component (B) is less than 0.2 m³/kg, the impact resistance of the resin composition tends to be insufficient, and when it exceeds 1.0 m³/kg, the fluidity of the resin composition deteriorates and a gel, imperfections or fish-eyes tend to be formed in the molded articles.

Further, component (C) of the resin composition is a copolymer of ethylene having an α-olefin content of from 0.7 to 1.5 wt % and an intrinsic viscosity [η] of from 0.2 to 1.0 m³/kg. Preferably, it is an ethylene copolymer having an α-olefin content of from 1.0 to 1.3 wt % and an intrinsic viscosity [η] of from 0.25 to 0.8 m³/kg. In component (C), if the α-olefin content is less than 0.7 wt %, ESCR of the composition tends to be too low, and if it exceeds 15 wt %, the stiffness of the composition deteriorates. Further, when the intrinsic viscosity [η] of component (C) is less than 0.2 m³/kg, the impact resistance of the resin composition tends to be insufficient, and when it exceeds 1.0 m³/kg, the fluidity of the resin composition deteriorates and a gel, imperfections or fish-eyes tend to be formed in the molded articles.

The composition ratio of these three components is such that the content of component (A) is from 10 to 90 wt %, preferably from 30 to 80 wt %, based on the total amount of the composition, and the contents of component (B) and (C) are such that the weight ratio of component (B):component (C) is from 10:1 to 1:5, preferably from 5:1 to 1:4.

Here, when the content of component (A) based on the total amount of the resin composition is less than 10 wt %, the fluidity of the resin composition tends to be low, and the moldability of the resin composition in blow molding or extrusion molding is poor. On the other hand, if it exceeds 90 wt %, a gel or fish-eyes tend to increase. Further, in the weight ratio of component (B) and (C), when the amount of component (C) is too small, ESCR of the resin composition tends to be low, and when it is too much, the stiffness of the resin composition tends to be low.

The physical properties of the entire composition comprising components (A), (B) and (C), and constituted by the above-mentioned ratio, are such that the intrinsic viscosity [η] is from 0.17 to 0.40 m³/kg, preferably from 0.18 to 0.35 m³/kg, and the density is from 935 to 968 kg/m³, preferably from 940 to 965 kg/m³.

When the intrinsic viscosity [η] of the entire composition is less than 0.17 m³/kg, ESCR or the impact resistance tends to be low, and when it exceeds 0.40 m3/kg, the fluidity tends to be low, and the moldability tends to be poor. When the density of the composition is less than 935 kg/m³, the stiffness tends to be low, and when it exceeds 968 kg/m³, ESCR tends to be low.

The resin composition comprising ethylene-based polymers of the present invention comprises components (A), (B) and (C), as mentioned above, but it may contain various additives, as the case requires. Such additives may be ones commonly used for polyolefin compositions. For example, an antioxidant, an antistatic agent, an ultraviolet light absorber, a lubricant, a flame retardant or a compatibilizer may be mentioned.

The method for producing a resin composition comprising ethylene-based polymers of the present invention comprises carrying out three steps (a), (b) and (c), and these steps can be carried out in an optional order. At first, step (a) is carried out at a polymerization temperature within a range of from 70 to 100° C. The reason for selecting the polymerization temperature to be from 70 to 100° C. is that if it is less than 70° C., the productivity becomes too low and if it exceeds 100° C., a part of the polymer melts and forms an aggregated state, whereby continuous operation becomes difficult. In this step (a), by carrying out homopolymerization of ethylene or copolymerization of ethylene with an α-olefin, an ethylene homopolymer or an ethylene copolymer having an α-olefin content of from 0 to 0.5 wt %, preferably from 0 to 0.3 wt %, and an intrinsic viscosity [η] of from 0.035 to 0.17 m³/kg, preferably from 0.040 to 0.15 m³/kg, is produced as component (A). At this time, the polymerization is carried out so that the amount of the polymer polymerized in this step becomes from 10 to 90 wt %, preferably from 30 to 80 wt % of the total composition. Here, the reason for limiting the α-olefin content, the intrinsic viscosity [η] and the amount of polymer, is the same as the reason for the limitation in the above-mentioned component (A).

Then, step (b) is carried out at a polymerization temperature within a range of from 40 to 90° C. The reason for selecting the polymerization temperature to be from 40 to 90° C. is that if it is less than 40° C., the productivity becomes too low, and if it exceeds 90° C., the productivity lowers and the intrinsic viscosity [η] becomes difficult to control. Further, in this step (b), by performing homopolymerization of ethylene or copolymerization of ethylene with an α-olefin, an ethylene homopolymer or an ethylene copolymer having an α-olefin content of from 0 to 0.5 wt %, preferably from 0 to 0.3 wt %, and an intrinsic viscosity [η] of from 0.2 to 1.0 m³/kg, preferably from 0.25 to 0.8 m³/kg, is produced as component (B). Here, the reason for limiting the α-olefin content and the intrinsic viscosity [η] is the same as the reason for the limitation in the above-mentioned component (B).

Further, step (c) is carried out at a polymerization temperature within a range of from 30 to 80° C. The reason for selecting the polymerization temperature to be from 30 to 80° C. is that if it is less than 30° C., the productivity becomes too low, and if it exceeds 80° C., the productivity becomes too low and the intrinsic viscosity [η] become difficult to control. Further, in this step (c), by performing copolymerization of ethylene with an α-olefin, an ethylene copolymer having an α-olefin content of from 0.7 to 15 wt %, preferably from 1.0 to 13 wt %, and an intrinsic viscosity [η] of from 0.2 to 1.0 m3/kg, preferably from 0.25 to 0.8 m³/kg, is produced as component (C). Here, the reason for limiting the α-olefin content and the intrinsic viscosity [η] is the same as the reason for the limitation in the above-mentioned component (C).

In the present invention, the molecular weights of components (B) and (C) are higher than that of component (A), as evident from intrinsic viscosities of each components, but they are not ultrahigh molecular weight as mentioned above. Further, the present invention has a characteristic that the difference in the molecular weight between component (B) and component (C) is not made so large, and the difference in the molecular weight between both components is preferably such that the difference in the intrinsic viscosity is preferably not more than 0.1 m³/kg, particularly preferably not more than 0.05 m³/kg, and it is preferred to carry out the production so that the difference in the intrinsic viscosity become as small as possible. The reason is that if the difference in the molecular weight is high, the compatibility of the composition deteriorates and consequently, the composition becomes ununiform and gel, imperfections or fish-eyes are likely to form.

As mentioned above, in the process of the present invention, steps (a), (b) and (c) can be carried out in any optional order. However, normally, it is preferred to carry out the process in the order of step (a), step (b), followed by step (c), or in the order of step (b), step (a), followed by step (c).

In order to produce the copolymer of ethylene constituting the resin composition of the present invention, it is necessary to copolymerize an α-olefin as a comonomer particularly to the high molecular weight portion. For this purpose, it is necessary to use a catalyst capable of providing good incorporation as much as possible, or to select an advantageous condition for copolymerization. As a catalyst for this purpose, a Ziegler type catalyst or a metallocene type catalyst may preferably be used. Particularly a Ziegler type catalyst or a metallocene type catalyst supported on a solid carrier is preferably used.

A Ziegler type catalyst to be used in the process of the present invention preferably consists of a solid catalyst component (E) containing at least titanium, magnesium and a halogen, and an organic aluminum compound component, as its main components. Here, the solid catalyst component (E) containing at least titanium, magnesium and a halogen, is preferably a composite solid formed by contacting a magnesium compound and a titanium halide compound. The method for its production and the obtained catalyst are not particularly restricted, and conventional ones can be used. As a specific method for producing the solid catalyst component (E), a method described, for example, in JP-B-50-32270, JP-B-52-13232 or JP-B-62-54326, may be used.

As the magnesium compound useful for producing the solid catalyst compound (E), various compounds used as carriers for Ziegler type catalysts may usually be used. For example, a magnesium halide such as magnesium chloride, magnesium bromide, magnesium iodide or magnesium fluoride, magnesium hydroxide, magnesium oxide, magnesium sulfate, magnesium carbonate, a hydroxymagnesium halide such as hydroxymagnesium chloride or hydroxymagnesium iodide, an alkoxy magnesium such as methoxy magnesium, ethoxy magnesium, propoxy magnesium or butoxy magnesium, an alkoxymagnesium halide such as methoxymagnesium chloride, methoxymagnesium bromide, ethoxymagnesium chloride, ethoxymagnesium bromide, propoxymagnesium chloride, propoxymagnesium bromide, butoxymagnesium chloride or butoxymagnesium bromide, an alkylmagnesium halide such as methylmagnesium chloride, methylmagnesium bromide, ethylmagnesium chloride, ethylmagnesium bromide, propylmagnesium chloride, propylmagnesium bromide, butylmagnesium chloride or butylmagnesium bromide, or a mixture of these, may be mentioned.

Further, as the magnesium compound useful for producing the solid catalyst component (E), a reaction product (D) of an organic silicon compound shown hereinafter, with an organic magnesium compound, or a product produced by having the reaction product (D) further reacted with an aluminum alkoxide compound or an aluminum alkoxyhalide compound, may also be used. An example of a process for producing such magnesium compounds is disclosed in JP-B-52-13232 and JP-B-62-54326.

The organic silicon compound to be used for producing the above-mentioned reaction product (D) of the present invention is preferably a hydropolysiloxane compound having an optional degree of polymerization, represented by the following formula:

$$R^1_a H_b SiO_{(4-a-b)/2} \tag{I}$$

wherein $R^1$ is a monovalent organic group selected from a group consisting of an alkyl group, an aryl group, an aralkyl group, an alkoxy group and an aryloxy group, and a is 0, 1 or 2, and b is 1, 2 or 3, provided a+b≦3, or a mixture of such hydropolysiloxane compounds. With regard to its nature, various ones from liquid ones having low degrees of polymerization and a low viscosity to greasy or waxy ones having various degrees of polymerizations and a viscosity of up to 100 Pascal·second at 25° C., and solid ones, may be mentioned. Since the structure of the terminal group of this hydropolysiloxane gives no substantial influence on the activity, it may be blocked by an optional inert group such as a trialkylsilyl group. As a specific example, tetramethyldisiloxane, diphenyldisiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane or chlorophenylhydropolysiloxane may be mentioned.

Another group of organic silicon compounds useful for producing the above-mentioned reaction product (D) of the present invention may be ones in which organic groups and hydroxyl groups are bonded to a silicon atom, particularly silane type compounds represented by the following formula:

$$R^2{}_n Si(OH)_{4-n} \quad (II)$$

wherein $R^2$ is a monovalent hydrocarbon residue having from 1 to 18 carbon atoms, and n is a number of 1, 2 or 3, and if multiple $R^2$ exist in one molecule, they may be the same or different, and polysiloxane type compounds which correspond to condensates thereof. As an example of $R^2$ in formula (II), an alkyl group, a cycloalkyl group, an aryl group, an aralkyl group or an alkaryl group may be mentioned. Such a group may be any one of straight chain type, branched chain type, saturated type, unsaturated type and ring type. As an example of the silane type compound of the above-mentioned formula (II) wherein n is 3, trimethylhydroxysilane, triethylhydroxysilane, triphenylhydroxysilane, methyldiphenylhydroxysilane or benzyldiphenylhydroxysilane, may be mentioned. Further, as an example of the compound wherein n is 2, diethyldihydroxysilane, dipropyldihydroxysilane, diallyldihydroxysilane, dicyclohexyldihydroxysilane or diphenyldihydroxysilane, may be mentioned. Further, as the compound wherein n is 1, butyltrihydroxysilane or phenyltrihydroxysilane, may be mentioned.

As the polysiloxane type compounds which correspond to condensates of the compounds of the above formula (II), ones having a siloxane condensation of Si—O—Si and having a straight chain, a branched chain or a three-dimensional network structure, may be used. Their degrees of polymerization are not particularly limited, and they may cover from ones having low degrees of polymerization and a viscosity of several m pascal·sec (mPa·sec) at 25° C., to greasy or waxy ones having a viscosity of up to 1,000,000 mPa·sec, and complete solid ones. As shown in formula (II), the polysiloxane type compound may be any one so long as it contains at least one hydroxyl group per molecule. However, one wherein the number of hydroxyl groups is too small, is not practically useful, and the content of hydroxyl groups in the polysiloxane type compound is preferably at least 0.1 wt %. As an example of such a polysiloxane type compound, an α, ω-dihydroxydimethylpolysiloxane represented by HO[Si(CH$_3$)$_2$O]$_n$H (wherein, n is an integer of at least 2), or an α, ω-dihydroxymethylphenylpolysiloxane represented by HO[Si(CH$_3$)(C$_6$H$_5$)O]$_n$H (wherein, n is an integer of at least 2), may be mentioned.

As the organic magnesium compound to be used for the reaction with an organic silicon compound represented by the above formula (I) or (II), various types of organic magnesium compounds may be used. A preferred example may be a compound of the formula $$(MgR^3{}_2)_p \cdot (R^3 MgX)_q \quad (III)$$

(wherein $R^3$ is a hydrocarbon group, X is a halogen atom, and p and q are numbers of from 0 to 1, having a relation of p+q=1) obtained by a reaction of a halogen-containing organic compound with metallic magnesium, its ether complex or a mixture thereof. As such an example, a so-called Gringnard reagent in a narrow sense represented by $R^3MgX$ i.e. p is 0 and q is 1, a dihydrocarbirmagnesium represented by $R^3{}_2Mg$ i.e. p is 1 and q is 0, other various organic magnesium halides represented by $(MgR^3{}_2)_p \cdot (R^3 MgX)_q$, an ether complex thereof or a mixture thereof, may be mentioned. These organic magnesium compounds may easily be prepared by conventional methods, for example, in an ether type solvent such as diethyl ether, dibutyl ether or tetrahydrofuran, or a hydrocarbon solvent such as heptane, octane, benzene or toluene, in the presence of an appropriate amount of a complexing agent such as an ether or an amine.

The method for reacting the organic silicon compound with the organic magnesium compound, may, for example, be the following method. Namely, for example, a Gringnard reagent prepared in a suitable solvent is added little by little to the organic silicon compound while stirring under an inert gas atmosphere. After all the amount is added, the stirring is continued for an additional predetermined period of time, to complete the reaction. The organic silicon compound can be used as it is without dilution. However, in some cases, it is more advantageous to use it as diluted by a hydrocarbon solvent or the like. This reaction can be carried out usually at a temperature of from −50° C. to 100° C. However, it is more advantageous to carry out the reaction at a temperature higher than room temperature. The reaction time in this case may sufficiently be from 30 minutes to 5 hours.

As the solvent for reaction, an inert hydrocarbon type solvent, namely, an aliphatic or aromatic hydrocarbon compound can be used. Specifically, hexane, heptane, cyclohexane, benzene, toluene or xylene may, for example, be mentioned. Further, an ether type solvent which is usually used for preparation of the above-mentioned Gringnard reagent, may also be used. The charging ratio of the organic silicon compound and the organic magnesium compound as raw materials, is preferably, OH:MgR$^3$=1:0.05 to 1, in the case of an organic silicon compound having a hydroxyl group, as expressed by a molar ratio of hydroxyl groups in the organic silicon compound to the magnesium-hydrocarbon group bond (MgR$^3$), and in the same way in the case of a hydropolysiloxane, it is preferably, Si:MgR$^3$= 1:0.05 to 1, as expressed by the molar ratio of silicon atoms (Si) in the hydropolysiloxane to the magnesium-hydrocarbon group bond (MgR$^3$). And, it can be optionally selected from these ranges.

In the present invention, as mentioned above, a product or a solid component obtained by reacting the reaction product (D) with an aluminum alkoxide compound or an aluminum alkoxyhalide compound, can be used. A preferred aluminum compound which may be used at that time, is a compound represented by the following formula (IV):

$$Al(OR^4)_n X_{3-n} \quad (IV)$$

(wherein $R^4$ is an alkyl group having from 1 to 12 carbons, n is in the range of 0<n≦3, and X is an halogen atom.)

As a specific example, aluminum trimethoxide, aluminum triethoxide, aluminum tri-n-propoxide, aluminum triisopropoxide, aluminum mono-sec-butoxydiisopropoxide, aluminum tri-n-butoxide, aluminum tri-sec-butoxide, aluminum tri-t-butoxide, aluminum monoethoxydichloride, aluminum diethoxymonochloride, aluminum monoisopropoxydichloride or aluminum diisopropoxymonochloride may be mentioned.

The reaction of the reaction product (D) with the aluminum compound of the above formula (IV) is sufficiently achieved only by mixing or reacting them in an inert hydrocarbon solvent at a temperature within a range of from −10 to 150° C. for from 5 minutes to 10 hours.

The halogen-containing titanium compound to be used for producing the Ziegler type solid catalyst component (E) of the present invention, is one represented by the formula $TiX_n(OR^5)_{4-n}$ (wherein X is a halogen atom, $R^5$ is a hydrocarbon group having from 1 to 8 carbon atoms, and n is an integer from 1 to 4). A specific example may be titanium tetrachloride, titanium tetrabromide, trichloroethoxytitanium, trichloro-n-butoxytitanium, dichlorodiethoxytitanium, dichlorodiisopropoxytitanium or dichlorodi-n-butoxytitanium. The Ziegler type solid catalyst component (E) of the present invention may contain vanadium besides titanium. A vanadium compound in this case may, for example, be vanadium tetrachloride, vanadyl trichloride, tetraethoxyvanadium, tetrabutoxyvanadium, triethoxyvanadium or tributoxyvanadium.

The reaction of the above-mentioned magnesium compound with the halogen-containing titanium compound, or with the halogen-containing titanium compound and the vanadium compound, is carried out usually preferably in an inert hydrocarbon solvent, at from 0 to 150° C., preferably from 20 to 100° C., for from 0.5 to 10 hours, preferably from 1 to 5 hours.

As the inert hydrocarbon solvent, an aromatic or halogenated aromatic hydrocarbon solvent such as benzene, toluene or chlorobenzene; or an aliphatic hydrocarbon solvent such as hexane, heptane or cyclohexane, may, for example, be used. After completion of the reaction, the solid phase is separated, and a free titanium or vanadium compound is removed by washing with an inert hydrocarbon solvent such as hexane, heptane or kerosine to recover the solid catalyst component (E).

The content of titanium, or titanium and vanadium, as transition metals in the solid catalyst component (E) thus obtained, can be appropriately adjusted by changing the condition for the reaction of the above-mentioned magnesium compound with the halogen-containing titanium compound, or with the halogen-containing titanium compound and the vanadium compound, such as the temperature, the time or the presence or absence of a solvent. Usually, the content is preferably from 1 to 120 mg as calculated as the transition metals per 1 g of the solid catalyst component (E). A catalyst using the solid catalyst component (E) having a content of the transition metals within this range, exhibits a high catalytic activity.

The metallocene catalyst as another catalyst preferably used in the present invention, is a catalyst which comprises a solid catalyst component (F) containing an aluminoxane and a metallocene compound, and an organic aluminum compound component, as the main components. Such a solid catalyst component (F) containing an aluminoxane and a metallocene compound, is a composite solid formed by contacting a solid carrier with an aluminoxane and a metallocene compound stepwise or all at once, and various known catalysts may be used without any particular restriction. For example, it can be obtained by reacting a solid carrier with an aluminoxane and a metallocene compound with stirring in a hydrocarbon solvent. A specific example of the method and the catalyst may be one disclosed in e.g. JP-A-8-208717, JP-A-10-255194 or JP-A-10-296535.

The solid carrier useful for the production of the solid catalyst compound (F) may, specifically, be an inorganic oxide such as silica, alumina, magnesia, zirconia or titania, a magnesium compound such as magnesium hydroxide, magnesium chloride or Mg(OH)Cl, a compound such as a chemically modified product of the above-mentioned reaction product (D), or an organic polymer such as polyethylene, polypropylene or polystyrene. Particularly, an inorganic oxide represented by silica or alumina, a magnesium compound represented by magnesium chloride or Mg(OH)Cl, or a chemically modified product of the above-mentioned reaction product (D), is preferably used.

As the solid carrier to be used in the present invention, a fine particulate solid having an average particle diameter within a range of from 1 to 500 μm, preferably from 5 to 300 μm, and having a specific surface area of from 5 to 1,000 $m^2/g$, preferably from 50 to 800 $m^2/g$, is preferred. One having a pore volume of from 0.3 to 3 $cm^3/g$, preferably from 0.5 to 2.5 $cm^3/g$, is preferred.

In the inorganic oxide or the magnesium compound as the solid carrier to be used in the present invention, the amount of water absorbed or the amount of hydroxyl groups on the surface varies depending on the treatment conditions. As their preferred ranges, the water content is at most 5 wt %, and the amount of hydroxyl groups on the surface is at least 1 $pc/(nm)^2$ unit area. The water content and the amount of hydroxyl groups on the surface, can be controlled by selecting the calcination temperature or the calcination time. Usually, the calcination is carried out at a temperature of from 100 to 1,000° C. for from 1 to 40 hours. Otherwise, instead of calcination, a chemical dehydration method using e.g. an organic aluminum compound, silicon tetrachloride or chlorosilane may be used.

As the chemically modified product of the reaction product (D), preferred is a fine particulate solid obtained by treating the reaction product (D) obtained by a reaction of the above-mentioned organic silicon compound with the organic magnesium compound, with an alcohol, followed by treating further with water, for example as disclosed in JP-A-10-255194.

As the aluminoxane to be used for producing the solid catalyst component (F), one commonly known, may be used. It may be prepared, for example, by a method of adding an aluminum compound little by little to a suspension in a hydrocarbon solvent containing a compound having absorbed water, such as silica, or a salt containing crystal water such as copper sulfate hydrate or copper aluminum sulfate hydrate, or a method of reacting an organic aluminum compound with water in a solid, liquid or gaseous phase in a hydrocarbon solvent.

As the metallocene compound to be used for the solid catalyst component (F), various known compounds may be used which have zirconium, titanium or hafnium as a metal centere, and which contain a ligand having e.g. a cyclopentadienyl skeleton or an indenyl skeleton, and contain a ligand X bonded to the transition metal. Here, the ligand X bonded to the transition metal may be optionally selected from the group consisting of a hydrogen atom, a halogen atom, an alkyl group, an aryl group, an alkoxy group and an aryloxy group wherein the hydrogen atom on the aromatic ring is substituted or not substituted.

As the above-mentioned metallocene compound, a group of compounds containing zirconium as the transition metal, and having a various aryloxy group such as a substituted or unsubstituted phenoxy group as the ligand X, may be mentioned.

Specifically, dicyclopentadienylbis(2-fluorophenoxy) zirconium, dicyclopentadienylbis(3-fluorophenoxy) zirconium, dicyclopentadienylbis(4-fluorophenoxy) zirconium, dicyclopentadienylbis(2-chlorophenoxy) zirconium, dicyclopentadienylbis(3-chlorophenoxy) zirconium, dicyclopentadienylbis(4-chlorophenoxy)

zirconium, dicyclopentadienylbis(2-bromophenoxy)zirconium, dicyclopentadienylbis(3-bromophenoxy)zirconium, dicyclopentadienylbis(4-bromophenoxy)zirconium, dicyclopentadienylbis(2-iodophenoxy)zirconium, dicyclopentadienylbis(3-iodophenoxy)zirconium, dicyclopentadienylbis(4-iodophenoxy)zirconium, dicyclopentadienylbis(2,3-difluorophenoxy)zirconium, dicyclopentadienylbis(2,4-difluorophenoxy)zirconium, dicyclopentadienylbis(2,5-difluorophenoxy)zirconium, dicyclopentadienylbis(2,6-difluorophenoxy)zirconium, dicyclopentadienylbis(3,4-difluorophenoxy)zirconium, dicyclopentadienylbis(3,5-difluorophenoxy)zirconium, dicyclopentadienylbis(2,3-dichlorophenoxy)zirconium, dicyclopentadienylbis(2,4-dichlorophenoxy)zirconium, dicyclopentadienylbis(2,5-dichlorophenoxy)zirconium, dicyclopentadienylbis(2,6-dichlorophenoxy)zirconium, dicyclopentadienylbis(3,4-dichlorophenoxy)zirconium, dicyclopentadienylbis(3,5-dichlorophenoxy)zirconium, dicyclopentadienylbis(2,3,4-trifluorophenoxy)zirconium, dicyclopentadienylbis(2,3,5-trifluorophenoxy)zirconium, dicyclopentadienylbis(2,3,6-trifluorophenoxy)zirconium, dicyclopentadienylbis(2,4,5-trifluorophenoxy)zirconium, dicyclopentadienylbis(2,4,6-trifluorophenoxy)zirconium, dicyclopentadienylbis(3,4,5-trifluorophenoxy)zirconium, dicyclopentadienylbis(2,3,5,6-tetrafluorophenoxy)zirconium, dicyclopentadienylbis(pentafluorophenoxy)zirconium, dicyclopentadienylbis(2-fluoromethylphenoxy)zirconium, dicyclopentadienylbis(3-fluoromethylphenoxy)zirconium, dicyclopentadienylbis(4-fluoromethylphenoxy)zirconium, dicyclopentadienylbis(2-chloromethylphenoxy)zirconium, dicyclopentadienylbis(3-chloromethylphenoxy)zirconium, dicyclopentadienylbis(4-chloromethylphenoxy)zirconium, dicyclopentadienylbis(2-trifluoromethylphenoxy)zirconium, dicyclopentadienylbis(3-trifluoromethylphenoxy)zirconium, dicyclopentadienylbis(4-trifluoromethylphenoxy)zirconium, dicyclopentadienylbis(3,5-bistrifluoromethylphenoxy)zirconium, dicyclopentadienylbis(2-(2,2,2-trifluoroethyl)phenoxy)zirconium, dicyclopentadienylbis(3-(2,2,2-trifluoroethyl)phenoxy)zirconium, dicyclopentadienylbis(4-(2,2,2-trifluoroethyl)phenoxy)zirconium, dicyclopentadienylbis(2-trichloromethylphenoxy)zirconium, dicyclopentadienylbis(3-trichloromethylphenoxy)zirconium, dicyclopentadienylbis(4-trichloromethylphenoxy)zirconium, dicyclopentadienylbis(2-methylphenoxy)zirconium, dicyclopentadienylbis(3-methylphenoxy)zirconium, dicyclopentadienylbis(4-methylphenoxy)zirconium, dicyclopentadienylbis(2,3-dimethylphenoxy)zirconium, dicyclopentadienylbis(2,4-dimethylphenoxy)zirconium, dicyclopentadienylbis(2,5-dimethylphenoxy)zirconium, dicyclopentadienylbis(2,6-dimethylphenoxy)zirconium, dicyclopentadienylbis(3,4-dimethylphenoxy)zirconium, dicyclopentadienylbis(3,5-dimethylphenoxy)zirconium, dicyclopentadienylbis(2,3,4-trimethylphenoxy)zirconium, dicyclopentadienylbis(2,3,5-trimethylphenoxy)zirconium, dicyclopentadienylbis(2,3,6-trimethylphenoxy)zirconium, dicyclopentadienylbis(2,4,5-trimethylphenoxy)zirconium, dicyclopentadienylbis(2,4,6-trimethylphenoxy)zirconium, dicyclopentadienylbis(3,4,5-trimethylphenoxy)zirconium, dicyclopentadienylbis(pentamethylphenoxy)zirconium, dicyclopentadienylbis(2-methyl-4-fluorophenoxy)zirconium, dicyclopentadienylbis(2-chloro-4-fluorophenoxy)zirconium, dicyclopentadienylbis(2-chloro-4-trifluoromethylphenoxy)zirconium, dicyclopentadienylbis(2-fluoro-4-trifluoromethylphenoxy)zirconium, dicyclopentadienylbis(2-trifluoromethyl-4-fluorophenoxy)zirconium, dicyclopentadienylbis(2-ethylphenoxy)zirconium, dicyclopentadienylbis(3-ethylphenoxy)zirconium, dicyclopentadienylbis(4-ethylphenoxy)zirconium, dicyclopentadienylbis(2-isopropylphenoxy)zirconium, dicyclopentadienylbis(3-isopropylphenoxy)zirconium, dicyclopentadienylbis(4-isopropylphenoxy)zirconium, dicyclopentadienylbis(2-tertiarybutylphenoxy)zirconium, dicyclopentadienylbis(3-tertiarybutylphenoxy)zirconium, dicyclopentadienylbis(4-tertiarybutylphenoxy)zirconium, dicyclopentadienylbis(3,5-ditertiarybutylphenoxy)zirconium, dicyclopentadienylbis(2,8-dimethyl-1-naphtoxy)zirconium, dicyclopentadienylbis(1-tertiarybutyl-2-naphtoxy)zirconium, dicyclopentadienylbis(8-bromo-2-naphtoxy)zirconium, dicyclopentadienylbis(2-phenylphenoxy)zirconium, dicyclopentadienylbis(3-phenylphenoxy)zirconium, dicyclopentadienylbis(4-phenylphenoxy)zirconium, dicyclopentadienylbis(2-benzylphenoxy)zirconium, dicyclopentadienylbis(2-methoxycarbonylphenoxy)zirconium, dicyclopentadienylbis(2-acetoxyphenoxy)zirconium, dicyclopentadienylbis(2-cyanophenoxy)zirconium, dicyclopentadienylbis(2-nitrophenoxy)zirconium, dicyclopentadienylbis(2-dimethylaminophenoxy)zirconium, dicyclopentadienylbis(2-trifluoromethanesulfonylphenoxy)zirconium, dicyclopentadienylbis(4-fluorothiophenoxy)zirconium, dicyclopentadienylbis(2-trifluoromethylthiophenoxy)zirconium, dicyclopentadienylbis(3-trifluoromethylthiophenoxy)zirconium, bis(methylcyclopentadienyl)bis(2-chlorophenoxy)zirconium, bis(methylcyclopentadienyl)bis(2-trifluoromethylphenoxy)zirconium, bis(1,2-dimethylcyclopentadienyl)bis(2-ethylphenoxy)zirconium, bis(1,3-dimethylcyclopentadienyl)bis(2-trifluoromethylphenoxy)zirconium, bis(1,3-dimethylcyclopentadienyl)bis(3-tertiarybutylphenoxy)zirconium, bis(1,2,3-trimethylcyclopentadienyl)bis(2-fluorophenoxy)zirconium, bis(1,2,3-trimethylcyclopentadienyl)bis(3-fluorophenoxy)zirconium, bis(1,2,3-trimethylcyclopentadienyl)bis(4-fluorophenoxy)zirconium, bis(1,2,3-trimethylcyclopentadienyl)bis(2-isopropylphenoxy)zirconium, bis(1,2,4-trimethylcyclopentadienyl)bis(2-trifluoromethylphenoxy)zirconium, bis(1,2,4-trimethylcyclopentadienyl)bis(2-methylphenoxy)zirconium, bis(1,2,4-trimethylcyclopentadienyl)bis(3-methylphenoxy)zirconium, bis(1,2,4-trimethylcyclopentadienyl)bis(4-methylphenoxy)zirconium, bis(1,2,4-trimethylcyclopentadienyl)bis(2,4-dimethylphenoxy)zirconium, bis(1,2,4-trimethylcyclopentadienyl)bis(2,4-dichlorophenoxy)zirconium, bis(1,2,4-trimethylcyclopentadienyl)bis(2-tertiarybutylphenoxy)zirconium, bis(1,2,4-trimethylcyclopentadienyl)bis(3-tertiarybutylphenoxy)zirconium, bis(1,2,4-trimethylcyclopentadienyl)bis(4-tertiarybutylphenoxy)zirconium, bis(1,2,3,4-tetramethylcyclopentadienyl)bis(2-methoxyphenoxy)zirconium, bis(1,2,3,4-tetramethylcyclopentadienyl)bis(3-methoxyphenoxy)zirconium, bis(1,2,3,4-tetramethylcyclopentadienyl)bis(4-methoxyphenoxy)zirconium, bis(1,2,3,4-tetramethylcyclopentadienyl)bis(2-iodophenoxy)zirconium, bis(1,2,3,4-tetramethylcyclopentadienyl)bis(3-iodophenoxy)zirconium, bis(1,2,3,4-tetramethylcyclopentadienyl)bis(4-iodophenoxy)zirconium, bis(1,2,3,4-tetramethylcyclopentadienyl)bis(2-thiomethylphenoxy)zirconium, bis(1,2,3,4-tetramethylcyclopentadienyl)bis(3-thiomethylphenoxy)zirconium, bis(1,2,3,4- tetramethylcyclopentadienyl)bis(4-thiomethylphenoxy) zirconium, bis(pentamethylcyclopentadienyl)bis(2-fluorophenoxy)zirconium, bis(pentamethylcyclopentadienyl)bis(3-fluorophenoxy)zirconium, bis(pentamethylcyclopentadienyl)bis(4-fluorophenoxy)zirconium, bis(ethylcyclopentadienyl)bis(2-ethylphenoxy)zirconium, bis(ethylcyclopentadienyl)bis(3-ethylphenoxy)zirconium, bis(ethylcyclopentadienyl)bis(4-ethylphenoxy)zirconium, bis(isopropylcyclopentadienyl)bis(2-acetylphenoxy)zirconium, bis(isopropylcyclopentadienyl)bis(3-acetylphenoxy)zirconium, bis(isopropylcyclopentadienyl)bis(4-acetylphenoxy)zirconium, bis(isopropylcyclopentadienyl)bis(2-methylphenoxy)zirconium, bis(isopropylcyclopentadienyl)bis(3-methylphenoxy)zirconium, bis(isopropylcyclopentadienyl)bis(4-methylphenoxy)zirconium, bis(n-butylcyclopentadienyl)bis(2-chlorophenoxy)zirconium, bis(n-butylcyclopentadienyl)bis(3-chlorophenoxy)zirconium, bis(n-butylcyclopentadienyl)bis(4-chlorophenoxy)zirconium, bis(n-butylcyclopentadienyl)bis(2-trifluoromethylphenoxy)zirconium, bis(n-butylcyclopentadienyl)bis(3-trifluoromethylphenoxy)zirconium, bis(n-butylcyclopentadienyl)bis(4-trifluoromethylphenoxy)zirconium, bis(n-butylcyclopentadienyl)bis(2-tertiarybutylphenoxy)zirconium, bis(n-butylcyclopentadienyl)bis(3-tertiarybutylphenoxy)zirconium, bis(n-butylcyclopentadienyl)bis(4-tertiarybutylphenoxy)zirconium, bis(n-butylcyclopentadienyl)bis(2-cyanophenoxy)zirconium, bis(n-butylcyclopentadienyl)bis(3-cyanophenoxy)zirconium, bis(n-butylcyclopentadienyl)bis(4-cyanophenoxy)zirconium, bis(tertiarybutylcyclopentadienyl)bis(2-fluorophenoxy)zirconium, bis(tertiarybutylcyclopentadienyl)bis(3-fluorophenoxy)zirconium, bis(tertiarybutylcyclopentadienyl)bis(4-fluorophenoxy)zirconium, bis(tertiarybutylcyclopentadienyl)bis(2-ethylphenoxy)zirconium, bis(tertiarybutylcyclopentadienyl)bis(3-ethylphenoxy)zirconium, bis(tertiarybutylcyclopentadienyl)bis(4-ethylphenoxy)zirconium, bis(tertiarybutylcyclopentadienyl)bis(2,4-dimethylphenoxy)zirconium, bis(1,3-ditertiarybutylcyclopentadienyl)bis(2-chlorophenoxy)zirconium, bis(1,3-ditertiarybutylcyclopentadienyl)bis(3-chlorophenoxy)zirconium, bis(1,3-ditertiarybutylcyclopentadienyl)bis(4-chlorophenoxy)zirconium, bis(1,3-ditertiarybutylcyclopentadienyl)bis(2-trifluoromethylphenoxy)zirconium, bis(1,3-ditertiarybutylcyclopentadienyl)bis(3-trifluoromethylphenoxy)zirconium, bis(1,3-ditertiarybutylcyclopentadienyl)bis(4-trifluoromethylphenoxy)zirconium, bis(phenylcyclopentadienyl)bis(2-phenylphenoxy)zirconium, bis(phenylcyclopentadienyl)bis(3-phenylphenoxy)zirconium, bis(phenylcyclopentadienyl)bis(4-phenylphenoxy)zirconium, bis(phenylcyclopentadienyl)bis(2,4-dichlorophenoxy)zirconium, bis(trimethylsilylcyclopentadienyl)bis(2-tertiarybutoxyphenoxy)zirconium, bis(trimethylsilylcyclopentadienyl)bis(3-tertiarybutoxyphenoxy)zirconium, bis(trimethylsilylcyclopentadienyl)bis(4-tertiarybutoxyphenoxy)zirconium, bis(trimethylsilylcyclopentadienyl)bis(2-phenylphenoxy)zirconium, bis(trimethylsilylcyclopentadienyl)bis(3-phenylphenoxy)zirconium, bis(trimethylsilylcyclopentadienyl)bis(4-phenylphenoxy)zirconium, bis(trimethylsilylcyclopentadienyl)bis(2,4-difluorophenoxy)zirconium, bis(cyclohexylcyclopentadienyl)bis(2-iodophenoxy)zirconium, bis(cyclohexylcyclopentadienyl)bis(3-iodophenoxy)zirconium, bis(cyclohexylcyclopentadienyl)bis(4-iodophenoxy)zirconium, bis(indenyl)bis(2-methylphenoxy)zirconium, bis(indenyl)bis(3-methylphenoxy)zirconium, bis(indenyl)bis(4-methylphenoxy)zirconium, bis(1-methylindenyl)bis(2-fluorophenoxy)zirconium, bis(1-methylindenyl)bis(3-fluorophenoxy)zirconium, bis(1-methylindenyl)bis(4-fluorophenoxy)zirconium, bis(2-methylindenyl)bis(2-bromophenoxy)zirconium, bis(2-methylindenyl)bis(3-bromophenoxy)zirconium, bis(2-methylindenyl)bis(4-bromophenoxy)zirconium, bis(5,6-dimethylindenyl)bis(2-isopropylphenoxy)zirconium, bis(5,6-dimethylindenyl)bis(3-isopropylphenoxy)zirconium, bis(5,6-dimethylindenyl)bis(4-isopropylphenoxy)zirconium, bis(5,6-dimethoxyindenyl)bis(2-cyanophenoxy)zirconium, bis(5,6-dimethoxyindenyl)bis(3-cyanophenoxy)zirconium, bis(5,6-dimethoxyindenyl)bis(4-cyanophenoxy)zirconium, bis(fluorenyl)bis(2-chlorophenoxy)zirconium, bis(fluorenyl)bis(3-chlorophenoxy)zirconium, bis(fluorenyl)bis(4-chlorophenoxy)zirconium, bis(4,5,6,7-tetrahydroindenyl)bis(2-tertiarybutylphenoxy)zirconium, bis(4,5,6,7-tetrahydroindenyl)bis(3-tertiarybutylphenoxy)zirconium, bis(4,5,6,7-tetrahydroindenyl)bis(4-tertiarybutylphenoxy)zirconium, bis(2-methyltetrahydroindenyl)bis(2-nitrophenoxy)zirconium, bis(2-methyltetrahydroindenyl)bis(3-nitrophenoxy)zirconium, bis(2-methyltetrahydroindenyl)bis(4-nitrophenoxy)zirconium, bis(2,7-ditertiarybutylfluorenyl)bis(2-trifluoromethylphenoxy)zirconium, bis(2,7-ditertiarybutylfluorenyl)bis(3-trifluoromethylphenoxy)zirconium, bis(2,7-ditertiarybutylfluorenyl)bis(4-trifluoromethylphenoxy)zirconium, ethylenebis(indenyl)bis(4-trifluoromethylphenoxy)zirconium, ethylenebis(indenyl)bis(4-fluorophenoxy)zirconium, ethylenebis(indenyl)bis(4-chlorophenoxy)zirconium, ethylenebis(indenyl)bis(2-fluorophenoxy)zirconium, ethylenebis(3-methylindenyl)bis(4-trifluoromethylphenoxy)zirconium, ethylenebis(3-methylindenyl)bis(4-fluorophenoxy)zirconium, ethylenebis(3-methylindenyl)bis(4-chlorophenoxy)zirconium, ethylenebis(3-methylindenyl)bis(2-fluorophenoxy)zirconium, ethylenebis(5,6-dimethylindenyl)bis(4-trifluoromethylphenoxy)zirconium, ethylenebis(5,6-dimethylindenyl)bis(4-fluorophenoxy)zirconium, ethylenebis(5,6-dimethylindenyl)bis(4-chlorophenoxy)zirconium, ethylenebis(5,6-dimethylindenyl)bis(2-fluorophenoxy)zirconium, ethylenebis(4,7-dimethylindenyl)bis(4-trifluoromethylphenoxy)zirconium, ethylenebis(4,7-dimethylindenyl)bis(4-fluorophenoxy)zirconium, ethylenebis(5,6-dimethoxyindenyl)bis(4-trifluoromethylphenoxy)zirconium, ethylenebis(5,6-dimethoxyindenyl)bis(4-fluorophenoxy)zirconium, ethylenebis(5,6-dihydroindenyl)bis(4-trifluoromethylphenoxy)zirconium, ethylenebis(5,6-dihydroindenyl)bis(4-fluorophenoxy)zirconium, ethylenebis(5,6-dihydroindenyl)bis(4-chlorophenoxy)zirconium, ethylenebis(5,6-dihydroindenyl)bis(2-fluorophenoxy)zirconium, ethylenebis(4,5,6,7-tetrahydroindenyl)bis(4-trifluoromethylphenoxy)zirconium, ethylenebis(4,5,6,7-tetrahydroindenyl)bis(4-fluorophenoxy)zirconium, ethylenebis(4,5,6,7-tetrahydroindenyl)bis(4-chlorophenoxy)zirconium, ethylenebis(4,5,6,7-tetrahydroindenyl)bis(2-fluorophenoxy)zirconium, methylenebis(cyclopentadienyl)bis(2-fluorophenoxy) zirconium, methylenebis(cyclopentadienyl)bis(2-ethylphenoxy)zirconium, methylenebis(methylcyclopentadienyl)bis(3-chlorophenoxy)zirconium, methylenebis(1,3-dimethylcyclopentadienyl)bis(2-trifluoromethylphenoxy)zirconium, methylenebis(n-butylcyclopentadienyl)bis(4-tertiarybutylphenoxy) zirconium, ethylenebis(3-methylcyclopentadienyl)bis(4-trifluoromethylphenoxy)zirconium, ethylenebis(3-methylcyclopentadienyl)bis(4-fluorophenoxy)zirconium, ethylenebis(3-isopropylcyclopentadienyl)bis(4-trifluoromethylphenoxy)zirconium, ethylenebis(3-isopropylcyclopentadienyl)bis(4-fluorophenoxy)zirconium, ethylenebis(3-tertiarybutylcyclopentadienyl)bis(4-trifluoromethylphenoxy)zirconium, ethylenebis(3-tertiarybutylcyclopentadienyl)bis(4-fluorophenoxy) zirconium, isopropylidene(cyclopentadienyl)(indenyl)bis(4-trifluoromethylphenoxy)zirconium, isopropylidene (cyclopentadienyl)(indenyl)bis(4-fluorophenoxy)zirconium, isopropylidene(methylcyclopentadienyl)(indenyl)bis(4-trifluoromethylphenoxy)zirconium, isopropylidene (methylcyclopentadienyl)(indenyl)bis(4-fluorophenoxy) zirconium, isopropylidenebis(indenyl)bis(4-trifluoromethylphenoxy)zirconium, isopropylidenebis(indenyl)bis(4-fluorophenoxy)zirconium, isopropylidene (cyclopentadienyl)(fluorenyl)bis(4-trifluoromethylphenoxy)zirconium, isopropylidene (cyclopentadienyl)(fluorenyl)bis(4-fluorophenoxy) zirconium, isopropylidene(3-methylcyclopentadienyl) (fluorenyl)bis(4-trifluoromethylphenoxy)zirconium, isopropylidene(3-methylcyclopentadienyl)(fluorenyl)bis(4-fluorophenoxy)zirconium, tetramethylethylidenebis(2-tertiarybutylcyclopentadienyl)bis(4-trifluoromethylphenoxy)zirconium, tetramethylethylidenebis(2-tertiarybutylcyclopentadienyl) bis(4-fluorophenoxy)zirconium, dimethylsilylenebis (indenyl)bis(4-trifluoromethylphenoxy)zirconium, dimethylsilylenebis(indenyl)bis(4-fluorophenoxy) zirconium, dimethylsilylenebis(2-methylindenyl)bis(4-trifluoromethylphenoxy)zirconium, dimethylsilylenebis(2-methylindenyl)bis(4-fluorophenoxy)zirconium, dimethylsilylenebis(2-ethylindenyl)bis(4-trifluoromethylphenoxy)zirconium, dimethylsilylenebis(2-ethylindenyl)bis(4-fluorophenoxy)zirconium, dimethylsilylenebis(2-methyl-5-isopropylindenyl)bis(4-trifluoromethylphenoxy)zirconium, dimethylsilylenebis(2-methyl-5-isopropylindenyl)bis(4-fluorophenoxy)zirconium, dimethylsilylenebis(4,5,6,7-tetrahydroindenyl)bis(4-trifluoromethylphenoxy)zirconium, dimethylsilylenebis(4,5,6,7-tetrahydroindenyl)bis(4-fluorophenoxy)zirconium, dimethylsilylenebis(2-tertiarybutylcyclopentadienyl)bis(4-trifluoromethylphenoxy)zirconium, dimethylsilylenebis(2-tertiarybutylcyclopentadienyl)bis(4-fluorophenoxy) zirconium, dimethylsilylenebis(2-tertiarybutyl-4-methylcyclopentadienyl)bis(4-fluorophenoxy)zirconium, dimethylsilylenebis(2-isopropyl-4-methylcyclopentadienyl) bis(4-fluorophenoxy)zirconium, dimethylsilylene(2,3,5-trimethylcyclopentadienyl)(2,4,5-trimethylcyclopentadienyl)bis(4-fluorophenoxy)zirconium, dimethylsilylene(2,4-dimethylcyclopentadienyl)(3,5-dimethylcyclopentadienyl)bis(4-fluorophenoxy)zirconium, dimethylsilylene(3-tertiarybutylcyclopentadienyl)(4-tertiarybutylcyclopentadienyl)bis(4-fluorophenoxy) zirconium, dimethylsilylene(3-methylcyclopentadienyl)(4-methylcyclopentadienyl)bis(4-fluorophenoxy)zirconium, dimethylsilylene(2,4-dimethylcyclopentadienyl)(3-methylcyclopentadienyl)bis(4-fluorophenoxy)zirconium, dimethylsilylene(2,4-dimethylcyclopentadienyl)(4-methylcyclopentadienyl)bis(4-fluorophenoxy)zirconium, dimethylsilylene(3,4-dimethylcyclopentadienyl)(3-methylcyclopentadienyl)bis(4-fluorophenoxy)zirconium, dimethylsilylene(3-tertiarybutylcyclopentadienyl)(3-methylcyclopentadienyl)bis(4-fluorophenoxy)zirconium, dimethylsilylene(3-tertiarybutylcyclopentadienyl)(4-methylcyclopentadienyl)bis(4-fluorophenoxy)zirconium, dimethylsilylene(2,3,5-trimethylcyclopentadienyl) (cyclopentadienyl)bis(4-fluorophenoxy)zirconium, dimethylsilylene(2,4-dimethylcyclopentadienyl) (cyclopentadienyl)bis(4-fluorophenoxy)zirconium, dimethylsilylene(3-tertiarybutylcyclopentadienyl) (cyclopentadienyl)bis(4-fluorophenoxy)zirconium, dimethylsilylene(3-methylcyclopentadienyl) (cyclopentadienyl)bis(4-fluorophenoxy)zirconium, dimethylsilylene(cyclopentadienyl)(indenyl)bis(4-trifluoromethylphenoxy)zirconium, dimethylsilylene (cyclopentadienyl)(indenyl)bis(4-fluorophenoxy)zirconium, diphenylsilylenebis(indenyl)bis(4-trifluoromethylphenoxy) zirconium, diphenylsilylenebis(indenyl)bis(4-fluorophenoxy)zirconium, dibenzylsilylenebis(indenyl)bis (4-trifluoromethylphenoxy)zirconium, dibenzylsilylenebis (indenyl)bis(4-fluorophenoxy)zirconium, methylphenylsilylenebis(2-methylindenyl)bis(4-trifluoromethylphenoxy)zirconium, methylphenylsilylenebis(2-methylindenyl)bis(4-fluorophenoxy)zirconium, dimethylsilylenebis(3,4-dimethylcyclopentadienyl)bis(4-trifluoromethylphenoxy) zirconium, dimethylsilylenebis(3,4-dimethylcyclopentadienyl)bis(4-fluorophenoxy)zirconium, dimethylsilylenebis(4,5,6,7-tetrahydroindenyl)bis(4-trifluoromethylphenoxy)zirconium or dimethylsilylenebis (4,5,6,7-tetrahydroindenyl)bis(4-fluorophenoxy)zirconium, may, for example, be mentioned.

Further, in the present invention, besides the above listed metallocene compounds, metallocene compounds having, for example, a chlorine atom, a bromine atom, a hydrogen atom, a methyl group, an ethyl group, a benzyl group or a phenyl group, as the ligand X, may also be used. Specifically, bis(cyclopentadienyl) zirconium monochloride monohydride, bis(cyclopentadienyl)zirconium monobromide monohydride, bis(cyclopentadienyl)methylzirconium hydride, bis(cyclopentadienyl)ethylzirconium hydride, bis (cyclopentadienyl)phenylzirconium hydride, bis (cyclopentadienyl)benzylzirconium hydride, bis (cyclopentadienyl)neopentylzirconium hydride, bis (methylcyclopentadienyl)zirconium monochloride monohydride, bis(indenyl)zirconium monochloride monohydride, bis(cyclopentadienyl)zirconium dichloride, bis(cyclopentadienyl)zirconium dibromide, bis (cyclopentadienyl)methylzirconium monochloride, bis (cyclopentadienyl)ethylzirconium monochloride, bis (cyclopentadienyl)cyclohexylzirconium monochloride, bis (cyclopentadienyl)phenylzirconium monochloride, bis (cyclopentadienyl)benzylzirconium monochloride, bis (cyclopentadienyl)zirconium dichloride, bis (dimethylcyclopentadienyl)zirconium dichloride, bis (trimethylcyclopentadienyl)zirconium dichloride, bis (butylcyclopentadienyl)zirconium dichloride, bis (cyclopentadienyl)dimethylzirconium, bis (cyclopentadienyl)diphenylzirconium, bis (cyclopentadienyl)dibenzylzirconium, bis(indenyl) zirconium dichloride, bis(indenyl) zirconium dibromide, bis (fluorenyl)zirconium dichloride, ethylenebis(indenyl) dimethylzirconium, ethylenebis(indenyl)diethylzirconium, ethylenebis(indenyl)diphenylzirconium, ethylenebis (indenyl)methylzirconium monochloride, ethylenebis (indenyl)ethylzirconium monochloride, ethylenebis (indenyl)methylzirconium monobromide, ethylenebis (indenyl)zirconium dichloride, ethylenebis(indenyl) zirconium dibromide, dimethylsilylenebis (cyclopentadienyl)zirconium dichloride, dimethylsilylenebis(indenyl)zirconium dichloride, dimethylsilylenebis(methylcyclopentadienyl)zirconium dichloride, dimethylsilylenebis(dimethylcyclopentadienyl) zirconium dichloride, dimethylsilylenebis (trimethylcyclopentadienyl)zirconium dichloride, isopropylidenebis(indenyl)zirconium dichloride or isopropylidene(cyclopentadienyl)(fluorenyl)zirconium dichloride, may, for example, be mentioned.

Further, as the metallocene compound of the present invention, besides the above listed various compounds, metallocene compounds wherein the metal centere is changed from the zirconium atom to a titanium atom or a hafnium atom may also be used.

The method for preparing the solid catalyst component (F) of the present invention containing a metallocene compound and an aluminoxane, is not particularly restricted. For example, (1) a method of mixing the aluminoxane and a solid carrier, followed by supporting a catalytic reaction product of the metallocene compound with the aluminoxane, on the solid carrier, (2) a method of mixing the aluminoxane and the solid carrier, followed by contacting and supporting the metallocene compound thereon, (3) a method of supporting the metallocene compound on the solid carrier, followed by mixing with the aluminoxane, or (4) a method of contacting a reaction product of the metallocene compound with the aluminoxane, with the solid carrier, may be used.

The method of contacting and supporting the metallocene compound and/or the aluminoxane on the solid carrier, is usually carried out in an inert hydrocarbon solvent. As the inert hydrocarbon solvent in such a case, an aromatic hydrocarbon solvent such as benzene, toluene or xylene; an aliphatic hydrocarbon solvent such as pentane, hexane, heptane, octane, decane or dodecane; or an alicyclic hydrocarbon solvent such as cyclopentane or cyclohexane, may, for example, be employed. Among them, an aromatic hydrocarbon solvent is particularly preferred.

The temperature for contacting the metallocene compound and/or the aluminoxane with the solid carrier, is usually from −50 to 200° C., preferably from −20 to 100° C., more preferably from 0 to 90° C. Further, the contacting time is usually from 5 minutes to 100 hours, preferably from 10 minutes to 20 hours.

The ratio of the metallocene compound and the aluminoxane to be used in the present invention, is preferably such that the molar ratio of the metallocene compound/aluminum atoms in the aluminoxane, is from 1/1 to 1/1,000, preferably from 1/10 to 1/500.

The ratio of the solid carrier and the aluminoxane to be used in the present invention is preferably such that the ratio of mole of aluminum atoms in the aluminoxane/the solid carrier (g) is from 1/1 to 1/1,000, preferably from 1/10 to 1/500. Further, the ratio of the solid carrier and the metallocene compound is preferably such that the ratio of mole of the metallocene compound/the solid carrier (g) is from 1/5 to 1/10,000, preferably from 1/10 to 1/1,000.

The solid catalyst component (E) or the solid catalyst component (F) to be used in the present invention, may be pre-polymerized in the presence of an olefin. The method for such pre-polymerization is such that an α-olefin is pre-polymerized in the presence of the solid catalyst component (E) or the solid catalyst component (F), if necessary in the presence of an organic aluminum compound.

The pre-polymerized solid catalyst component (E) or the pre-polymerized solid catalyst component (F) preferably contains the polymer in an amount of from 0.1 to 500 g, particularly from 0.3 to 300 g, per 1 g of the solid catalyst component (E) or the solid catalyst component (F).

In the present invention, ethylene is homo-polymerized, or ethylene and an α-olefin having preferably at least 4 carbon atoms, particularly preferably from 4 to 20 carbon atoms, are copolymerized by a slurry polymerization method or a gas phase polymerization method in the presence of the solid catalyst component (E) or the solid catalyst component (F) subjected to or not subjected to the pre-polymerization as mentioned above. The α-olefin may, for example, be 1-butene, 1-pentene, 1-hexene, 4-methyl-1-pentene, 1-octene, 1-decene, 1-dodecene, 1-tetradecene, 1-hexadecene, 1-octadecene or 1-icocene. In the case of the slurry polymerization, the solvent for the polymerization may, for example, be an aliphatic hydrocarbon such as propane, butane, pentane, hexane, heptane, octane, decane, dodecane or kerosine; an alicyclic hydrocarbon such as cyclopentane, cyclohexane or methylcyclopentane; an aromatic hydrocarbon such as benzene, toluene or xylene; or a halogenated hydrocarbon such as ethylene chloride, chlorobenzene or dichloromethane. These media may be used alone or in combination as a mixture.

The amount of the solid catalyst component used for the polymerization, is usually from $10^{-8}$ to $10^{-3}$ g atom, preferably from $10^{-7}$ to $10^{-4}$ g atom per 1 l of the polymerization volume, as calculated based on the transition metal atoms in the solid catalyst component (E) or the solid catalyst component (F). Further, the amount of the organic aluminum compound for polymerization is usually from 1 to 1,000 mole, preferably from 10 to 500 mole, per 1 g atom of the transition metal atoms in the solid catalyst component (E) or the solid catalyst component (F).

The slurry concentration in the slurry polymerization is usually within a range of at least 100 g/l, preferably from 100 to 700 g/l, more preferably from 150 to 600 g/l, particularly preferably from 200 to 500 g/l.

The total pressure in polymerization is usually from atmospheric pressure to 10 MPa, preferably from atmospheric pressure to 5 MPa. The polymerization can be carried out in any one of a batch process, a semi-continuous process and a continuous process. The molecular weight of the olefin polymer can be controlled by addition of hydrogen to the polymerization system or by changing the polymerization temperature.

Now, the present invention will be further described in more detail by way of Examples. However, the present invention is by no means restricted to such specific Examples.

The physical properties of resin composition in the present invention were measured by the following methods.

(1) α-olefin content (unit: wt %)
  Calculated by $^{13}$C-NMR measurement
(2) Intrinsic viscosity [η] (unit: m$^3$/kg)
  Measured in accordance with JIS K7367-3 in a decalin solution of 135° C.
(3) Density (unit: kg/m$^3$)
  Measured in accordance with JIS K7112 by a density-gradient column method (23° C.).
(4) Flexural modulus (unit: MPa)
  Measured in accordance with JIS K7171.

(5) ESCR (unit: h)

Measured in accordance with the polyethylene test method in the attachment (regulations) in JIS K6922-2.

EXAMPLE 1

Preparation of Reaction Product (D)-1

Into a glass reactor dried and flushed with nitrogen, 300 ml of a tetrahydrofuran solution of n-butylmagnesium chloride (0.670 mol as n-butylmagnesium chloride) was charged, and 42.0 ml (0.70 mol as Si) of methylhydropolysiloxane in which the terminals sealed with trimethylsilyl groups (viscosity at 25° C.: about 20 mPa·sec) was gradually dropwise added with stirring. Heat evolution was observed, and the reactor was cooled, and after the whole amount was added, the system was maintained at 70° C. for one hour, then the reaction mixture was cooled to room temperature to give a dark brown transparent solution. To remove excess tetrahydrofuran, this solution was diluted with 400 ml of toluene, and 480 ml of tetrahydrofuran and toluene mixture was evaporated under a reduced pressure at from 160 to 170 mmHg. Then, 480 ml of toluene was added, and 480 ml of tetrahydrofuran and toluene mixture was evaporated in the same manner as above. The resultant solution was diluted with toluene to give 452 ml of reaction product (D)-1 as a toluene solution having a Mg concentration of 1.48 mol/l.

Preparation of Solid Catalyst Component (E)-1

Into a glass reactor equipped with a stirrer, a dropping funnel, a cooling condenser and a thermometer and dried and flushed with nitrogen, 815 ml of toluene and 135.8 ml of diethylaluminum chloride were introduced and heated to 50° C. 153 ml of toluene, 66.2 ml of ethanol and 86.8 ml of isopropyl alcohol were charged into a dropping funnel, and this mixed liquid was dropwise added over one hour. The reaction mixture was heated to reflux for one hour, to this reaction product, 123 ml of toluene and 243 ml of the above-mentioned reaction product (D)-1 (containing 0.36 g atom of Mg) were added and heated to reflux for two hours. The reaction product was cooled to 50° C., and 198 ml of titanium tetrachloride was dropwise added thereto over a period of one hour. Then, the reaction mixture was heated to 75° C., and reacted at this temperature for two hours. n-hexane was added to the slurry, and a soluble component was removed by filtration, and this operation was repeated six times to obtain solid catalyst component (E)-1. This solid catalyst component (E)-1 contained 27.2 mg/g of titanium.

Preparation of Ethylene Copolymer

An autoclave having an internal capacity of 300 l and equipped with a stirrer, was thoroughly flushed with nitrogen, and 95 l of n-hexane, 95 mmol of triethylaluminum and 2.4 g of the solid catalyst component (E)-1, were charged into the autoclave. The internal temperature was elevated to 80° C., and polymerization was carried out for 3 hours with continuously supplying ethylene and hydrogen. During the polymerization, the molar ratio of ethylene to hydrogen in the gas phase was maintained to be 1 to 2.35 and the total pressure was maintained to be 0.8 MPa (gage pressure). As a result, 13.2 kg of polyethylene was formed in this step. The temperature was immediately lowered to 60° C., and then, ethylene and hydrogen were purged.

Then, the temperature was raised to 75° C., and ethylene, hydrogen and 1-butene were supplied while maintaining the total pressure to be 0.3 MPa (gage pressure). The polymerization in second stage was carried out for two hours maintaining the molar ratio of ethylene to hydrogen in the gas phase to be 100 to 38, and the molar ratio of ethylene to 1-butene in the gas phase to be 1,000 to 7. As a result, 17.6 kg of ethylene were supplied. The temperature was immediately lowered to 60° C., and then, ethylene, hydrogen and 1-butene were purged. Then, the temperature was raised again to 75° C., and while maintaining the total pressure to be 0.2 MPa (gage pressure), ethylene, hydrogen and 1-butene were supplied. The polymerization in third stage was carried out for two hours maintaining the molar ratio of ethylene to hydrogen in the gas phase to be 100 to 22, and the molar ratio of ethylene to 1-butene in the gas phase to be 100 to 7.5. The total amount of the formed polymers was 22.0 kg.

Analyses of the polymers obtained in the each stages were carried out, and the polymerized amount, the molecular weight and the 1-butene content of the polyethylene component formed in each step, were obtained. The results were shown in Table 1. Further, the obtained resin comprising ethylene-based polymers was palletized by a twin screw extruder, whereupon the molecular weight, the density, the flexural modulus and ESCR of the resin composition were measured. The results were shown in Table 1.

Further, to examine the degrees of the gel or imperfections with respect to the obtained resin composition, the composition was palletized by a twin screw extruder and then formed into an inflation film having a thickness of 20 μm, whereby the obtained film was uniform, and no gel or imperfections were observed.

Comparative Example 1

In Example 1, after producing the first polyethylene component in the first step, without dividing into two steps for the second and third components of the polyethylene composition, production of a high molecular weight component was carried out by control of the ethylene to hydrogen molar ratio and the ethylene to 1-butene molar ratio in the gas phase of the second step so that the molecular weight and the density of the final product would be substantially the same as in Example 1.

Analyses of the polymers obtained in the each stages were carried out, and the polymerized amount, the molecular weight and the 1-butene content of the polyethylene component formed in each step, were obtained. The results were shown in Table 1.

The flexural modulus of the resin composition in this Example were substantially equal to the one in Example 1, but ESCR of the resin composition in this Example was remarkably poor as compared with the results in Example 1.

Comparative Example 2

In Example 1, one component among the three components of the resin composition was changed to the production of an ultrahigh molecular weight component of the prior art. Namely, an autoclave having an internal capacity of 300 l and equipped with a stirrer, was thoroughly flushed with nitrogen, and 95 l of n-hexane, 95 mmol of triethylaluminum and 2.4 g of the solid catalyst component (E)-1, were charged into the autoclave. The internal temperature was elevated to 80° C., and then, ethylene, hydrogen and 1-butene were supplied while maintaining the pressure to be 0.6 MPa (gage pressure). The polymerization was carried out for 1.5 hours, maintaining the molar ratio of ethylene to hydrogen in the gas phase to be 1 to 2.35, and the molar ratio of ethylene to 1-butene in the gas phase to be 1,000 to 5. As a result, 16.5 kg of polyethylene were formed.

The temperature was immediately lowered to 40° C., and then ethylene, hydrogen and 1-butene were purged. Then, the temperature was raised to 50° C., and ethylene, hydrogen and 1-butene were supplied while maintaining the temperature to be 0.1 MPa (gage pressure). The polymerization in second stage was carried out for 50 minutes, maintaining the molar ratio of ethylene to hydrogen in the gas phase to be 100 to 7.9, and the molar ratio of ethylene to 1-butene in the gas phase to be 100 to 2.1. As a result, 21.0 kg of ethylene were supplied. Then, the temperature was raised to 75° C., and ethylene, hydrogen and 1-butene were supplied, while maintaining the pressure to be 0.6 MPa (gage pressure). The polymerization in third stage was carried out for two hours, maintaining the molar ratio of the ethylene to hydrogen in the gas phase to be 1 to 1.6, and the molar ratio of ethylene to 1-butene in the gas phase to be 100 to 1.7. As a result, The total amount of formed polymers was 37.5 kg.

Analyses of the polymers obtained in the each stages were carried out, and the polymerized amount, the molecular weight and the 1-butene content of the polyethylene component formed in each step, were obtained. The results were shown in Table 1. ESCR of this resin composition was remarkably poor as compared with the results in Example 1.

Further, the composition was palletized by a twin screw extruder and then formed into an inflation film having a thickness of 20 μm, whereby the obtained film was not uniform, and gel or imperfections were observed.

EXAMPLE 2

In Example 1, three stage polymerization was carried out in order to produce the composition which has lower [η] of component (A), higher 1-butene content of component (C) and substantially same molecular weights of components (B) and (C) adjusted by control of the molar ratio of ethylene to hydrogen in the gas phase. The results were shown in Table 1.

Comparative Example 3

In Example 2, after producing the first polyethylene component in the first step, without dividing into two steps for the second and third components of the polyethylene composition, production of a high molecular weight component was carried out by adjusting the ethylene to hydrogen molar ratio and the ethylene to 1-butene molar ratio in the gas phase in the second step so that the molecular weight and the density of the final product would be substantially equal to Example 2.

The analytical results of the composition are shown in Table 1. The flexural modulus of composition in this Example was lower than the results in Example 1, and further, ESCR was remarkably poor as compared with the results in Example 2.

EXAMPLE 3

Preparation of Solid Catalyst Component (F)-1

In a glass reactor of 1.5 l thoroughly flushed with nitrogen, 70 g of silica calcined at 200° C. for 4 hours (specific surface area: 463 m$^2$/g, the amount of water absorbed: 0.1 wt %, amount of hydroxyl groups on the surface 2.16 wt %) was suspended in 1 l of toluene, and then, 470 ml of a toluene solution of methylaluminoxane (1.49 mol/l, as calculated as Al atoms) was dropwise added over 1.5 hours. During this operation, the temperature of the reaction system was maintained to be from 15 to 30° C. The reaction was continued for further 30 minutes within the temperature range, and then, the temperature was raised to 80° C. over one hour, followed by a reaction at that temperature for one hour. Then, the temperature was lowered to room temperature, and the supernatant was removed by decantation.

The residual solid component thus obtained was washed with toluene for three times, and then, 1 l of toluene was added to the slurry again. 100 ml of a toluene solution of bis(1,3-dimethylcyclopentadienyl)bis(2-trifluoromethylphenoxy)zirconium (70 mmol/l as calculated as Zr atoms) was dropwise added to the mixture over 30 minutes at room temperature, and then mixture was heated for further one hour at 80° C. Then, the supernatant was removed, the residual solid component was washed with toluene for six times. Then, the solid component was washed with hexane for six times, to obtain solid catalyst component (F-1) containing zr in an amount of 3.36 mg per 1 g.

Preparation of Solid Catalyst Component (F)-1 Subjected to Pre-Polymerization

Into a stainless steel reactor of 1.6 l thoroughly flushed with nitrogen and ethylene, 1 l of hexane, 10 mmol of triethylaluminum and 12 g of the above-mentioned solid catalyst component (F-1) were charged sequentially. Ethylene was introduced at 40° C., and pre-polymerization was carried out for 20 minutes while maintaining the pressure in the system to be from 0.02 to 0.04 MPa (gage pressure) and the temperature to be 40° C. After completion of the pre-polymerization, the interior was flushed with nitrogen, and then, the supernatant was removed, followed by washing twice with hexane. Thus, 48 g of pre-polymerized solid catalyst component (F)-1 having 3 g of a polymer per 1 g of the solid catalyst, was obtained.

Preparation of Ethylene Copolymer

An autoclave having an internal capacity of 300 l and equipped with a stirrer, was flushed with nitrogen and then further flushed with ethylene, whereupon 110 l of n-hexane and 110 mmol of triethylaluminum were introduced into the autoclave. The internal temperature was raised to 75° C., and after adjusting the molar ratio of the ethylene to hydrogen in the gas phase to be 1,000 to 5.3 and the pressure to be 1.0 MPa (gage pressure), 48 g of the solid catalyst component (F)-1 subjected to the pre-polymerization (containing 36 g of pre-polymerized polymer) was introduced over one hour. When the polymerization reaction initiated, the pressure started to decrease, and ethylene and hydrogen were supplied maintaining the pressure and the molar ratio of ethylene to hydrogen in the gas phase to be constant. Polymerization was carried out for 5 hours, whereby the 30 kg of polyethylene were produced.

Immediately, ethylene and hydrogen were purged to 0.05 MPa (gage pressure) while the temperature was maintained at 75° C. Then, the polymerization in second stage was carried out for 2.5 hours while maintaining the molar ratio of ethylene to hydrogen in the gas phase to be 1,000 to 0.22 and the pressure to be from 0.6 to 0.7 MPa (gage pressure), whereby the total amount of formed polymers, reached 43.8 kg. Immediately, ethylene and hydrogen were purged while lowering the temperature to 60° C. Then, the temperature was raised again to 75° C., and ethylene, hydrogen and 1-butene were supplied while maintaining the pressure to be from 0.4 to 0.5 MPa (gage pressure), and third stage polymerization was carried out for two hours maintaining the molar ratio of the ethylene to hydrogen in the gas phase to be 1,000 to 0.22 and the molar ratio of ethylene to 1-butene in the gas phase to be 100 to 2.6, whereby the total amount of formed polymers was 48.2 kg.

Analyses of the polymers obtained in the each stages were carried out, and the polymerized amount, the molecular weight and the 1-butene content of the polyethylene component formed in each step, were obtained. The results were shown in Table 1. Further, the obtained resin composition was pelletized by a twin screw extruder, whereupon the molecular weight, the density, the flexural modulus and ESCR of the resin composition were measured. The results are shown in Table 1.

EXAMPLES 4 TO 8

In Example 3, polymerization was carried out by adjusting the ethylene to hydrogen molar ratio and the ethylene to 1-butene molar ration in the gas phase, so that the molecular weight, the 1-butene content and the polymerized amount of the polyethylene component formed in each polymerization step of the three stages, would become the values as identified in Table 1.

The results of measurements of the molecular weight, the density, the flexural modulus and ESCR of the obtained polyethylene copolymer composition, are shown in Table 1.

Comparative Examples 4 to 7

In Example 3, after preparing the first polyethylene component in the first step, without dividing into two steps for the second and third components of the polyethylene composition, production of a high molecular weight component was carried out by adjusting the ethylene to hydrogen molar ratio and the ethylene to 1-butene molar ratio in the gas phase in the second step, so that the intrinsic viscosity [η] (i.e. the molecular weight) and the density of the final product would be substantially equal to the results in Examples 3 to 8. The analytical results of each composition are shown in Table 1.

When the foregoing Examples and Comparative Examples are compared with respect to the polyethylene compositions wherein the final products had substantially the same intrinsic viscosity [η] and density, it is evident that those prepared by the process of the present invention are superior in both the flexural modulus and ESCR (comparison of Examples 3 and 4, with Comparative Example 4), or they are improved substantially in ESCR while the flexural modulus is substantially the same (comparison between Example 6 and Comparative Example 5, comparison between Example 7 and Comparative Example 6, and comparison between Example 8 and Comparative Example 7).

EXAMPLE 9

Polymerization was carried out in the same manner as in Example 7 except that 1-butene was changed to 1-octene. The obtained results are shown in Table 1. As compared with Comparative Example 6, ESCR of this composition was extremely high.

As described in the foregoing, the ethylene copolymer composition of the present invention is superior in stiffness and ESCR to conventional ethylene copolymer composition, whereby a blow molded article or extrusion molding product having a higher performance than the conventional products, can be obtained.

Further, the resin composition comprising ethylene-based polymers of the present invention contains no ultrahigh molecular weight component as in the conventional composition, whereby the molded product thereby obtained is substantially free from imperfections, gel or fish-eyes.

Further, such an ethylene copolymer composition of the present invention can be produced advantageously and efficiently by the multi-step polymerization method of the present invention.

The entire disclosure of Japanese Patent Application No. 2001-239836 filed on Aug. 7, 2001 including specification, claims and summary are incorporated herein by reference in its entirety.

TABLE 1

|  | 1st polymerization stage ||||  2nd polymerization stage ||||
|---|---|---|---|---|---|---|---|---|
|  | α-olefin || | Polymerized | α-olefin || | Polymerized |
|  | Type | Content (wt %) | [η] m³/kg | amount (wt %) | Type | Content (wt %) | [η] m³/kg | amount (wt %) |
| Ex. 1 | — | — | 0.097 | 59.9 | 1-butene | 0.10 | 0.384 | 20.1 |
| Comp. Ex. 1 | — | — | 0.096 | 62.5 | 1-butene | 1.00 | 0.364 | 37.5 |
| Comp. Ex. 2 | 1-butene | 0.07 | 0.098 | 44.0 | 1-butene | 0.30 | 0.181 | 44.0 |
| Ex. 2 | — | — | 0.055 | 59.8 | — | — | 0.517 | 20.0 |
| Comp. Ex. 3 | — | — | 0.055 | 58.4 | 1-butene | 0.46 | 0.491 | 41.6 |
| Ex. 3 | — | — | 0.067 | 62.2 | — | — | 0.478 | 28.3 |
| Ex. 4 | — | — | 0.065 | 55.0 | — | — | 0.349 | 35.0 |
| Ex. 5 | — | — | 0.088 | 60.5 | — | — | 0.384 | 19.9 |
| Ex. 6 | — | — | 0.097 | 60.1 | — | — | 0.382 | 20.1 |
| Comp. Ex. 4 | — | — | 0.066 | 54.2 | 1-butene | 0.15 | 0.339 | 45.8 |
| Comp. Ex. 5 | — | — | 0.089 | 60.2 | 1-butene | 1.72 | 0.415 | 39.8 |
| Ex. 7 | — | — | 0.057 | 61.2 | — | — | 0.511 | 18.8 |
| Ex. 8 | — | — | 0.043 | 53.6 | 1-butene | 0.10 | 0.502 | 23.4 |
| Ex. 9 | — | — | 0.057 | 60.5 | — | — | 0.515 | 19.2 |
| Comp. Ex. 6 | — | — | 0.056 | 59.4 | 1-butene | 0.47 | 0.485 | 40.6 |
| Comp. Ex. 7 | — | — | 0.053 | 51.5 | 1-butene | 0.46 | 0.458 | 48.5 |

TABLE 2

| | 3rd polymerization stage | | | | Copolymer composition | | | |
|---|---|---|---|---|---|---|---|---|
| | α-olefin | | | Polymerized | | | Flexural | |
| | Type | Content (wt %) | [η] m³/kg | amount (wt %) | [Θ] (m³/kg) | Density (kg/m³) | modulus (MPa) | ESCR (h) |
| Ex. 1 | 1-butene | 2.9 | 0.387 | 20.0 | 0.212 | 954.0 | 1080 | 215 |
| Comp. Ex. 1 | — | — | — | — | 0.197 | 952.0 | 1014 | 25 |
| Comp. Ex. 2 | 1-butene | 0.3 | 1.14 | 12.0 | 0.208 | 955.0 | 1161 | 14 |
| Ex. 2 | 1-butene | 3.3 | 0.511 | 20.2 | 0.240 | 955.2 | 1137 | 1050 |
| Comp. Ex. 3 | — | — | — | — | 0.236 | 956.0 | 998 | 235 |
| Ex. 3 | 1-butene | 6.5 | 0.430 | 9.5 | 0.209 | 961.4 | 1308 | 24 |
| Ex. 4 | 1-butene | 1.6 | 0.351 | 10.0 | 0.193 | 960.2 | 1263 | 21 |
| Ex. 5 | 1-butene | 7.5 | 0.379 | 19.6 | 0.206 | 953.0 | 1053 | 400 |
| Ex. 6 | 1-butene | 11.2 | 0.384 | 19.8 | 0.212 | 950.0 | 973 | 580 |
| Comp. Ex. 4 | — | — | — | — | 0.191 | 958.1 | 1162 | 14 |
| Comp. Ex. 5 | — | — | — | — | 0.218 | 950.1 | 975 | 98 |
| Ex. 7 | 1-butene | 3.5 | 0.509 | 20.0 | 0.233 | 955.4 | 1144 | >5000 |
| Ex. 8 | 1-butene | 9.2 | 0.499 | 23.0 | 0.255 | 950.5 | 986 | >5000 |
| Ex. 9 | 1-octene | 3.7 | 0.502 | 20.3 | 0.235 | 953.5 | 1075 | >5000 |
| Comp. Ex. 6 | — | — | — | — | 0.230 | 956.0 | 1056 | 215 |
| Comp. Ex. 7 | — | — | — | — | 0.249 | 951.0 | 985 | 545 |

What is claimed is:

1. A resin composition comprising the following components (A), (B) and (C), wherein the content of component (A) is from 10 to 90 wt %, component (B):component (C)=from 10:1 to 1:5 (weight ratio), the intrinsic viscosity [η] is in the range from 0.17 to 0.40 m³/kg, and the density is in the range from 935 to 968 kg/m³:

Component (A): a homopolymer of ethylene or a copolymer of ethylene having an α-olefin content of from 0 to 0.5 wt %, and an intrinsic viscosity [η] of from 0.035 to 0.17 m³/kg, Component (B): a homopolymer of ethylene or a copolymer of ethylene having an α-olefin content of from 0 to 0.5 wt %, and an intrinsic viscosity [η] of from 0.2 to 1.0 m³/kg, and Component (C): a copolymer of ethylene having an α-olefin content of from 0.7 to 15 wt %, and an intrinsic viscosity [η] of from 0.2 to 1.0 m³/kg.

2. The resin composition according to claim 1, comprising the following components (A), (B) and (C):

Component (A): a homopolymer of ethylene or a copolymer of ethylene having an α-olefin content of from 0 to 0.3 wt %, and an intrinsic viscosity [η] of from 0.040 to 0.15 m³/kg, Component (B): a homopolymer of ethylene or a copolymer of ethylene having an α-olefin content of from 0 to 0.3 wt %, and an intrinsic viscosity [η] of from 0.25 to 0.8 m³/kg, and Component (C): a copolymer of ethylene having an α-olefin content of from 1.0 to 13 wt %, and an intrinsic viscosity [η] of from 0.25 to 0.8 m³/kg.

3. A process for producing a resin composition comprising ethylene-based polymers, which comprises carrying out step (a): a step of producing from 10 to 90 wt %, based on the total amount of polymerized polymers, of a homopolymer of ethylene or a copolymer of ethylene having an α-olefin content of from 0 to 0.5 wt %, and an intrinsic viscosity [η] of from 0.035 to 0.17 m³/kg, at a temperature of from 70 to 110° C., step (b): a step of producing a homopolymer of ethylene or a copolymer of ethylene having an α-olefin content of from 0 to 0.5 wt %, and an intrinsic viscosity [η] of from 0.2 to 1.0 m³/kg, at a temperature of from 40 to 90° C., and step (c): a step of producing a copolymer of ethylene having an α-olefin content of from 0.7 to 15 wt %, and an intrinsic viscosity [η] of from 0.2 to 1.0 m³/kg, at a temperature of from 30 to 80° C., in an optional order, by using a catalyst which comprises a solid catalyst component (E) containing at least titanium, magnesium and a halogen, and an organic aluminum compound, wherein the three-step polymerization is carried out so that the ratio of amount of polymerized polymers in steps (b) and (c) becomes step (b):step (c)=from 10:1 to 1:5 (weight ratio), to produce a resin composition having an intrinsic viscosity [η] of from 0.17 to 0.4 m³/kg and a density of from 935 to 968 kg/m³.

4. A process for producing a resin composition comprising ethylene-based polymers, which comprises carrying out step (a): a step of producing from 10 to 90 wt %, based on the total amount of polymerized polymer, of a homopolymer of ethylene or a copolymer of ethylene having an α-olefin content of from 0 to 0.5 wt %, and an intrinsic viscosity [η] of from 0.035 to 0.17 m³/kg, at a temperature of from 70 to 100° C., step (b): a step of producing a homopolymer of ethylene or a copolymer of ethylene having an α-olefin content of from 0 to 0.5 wt %, and an intrinsic viscosity [η] of from 0.2 to 1.0 m³/kg, at a temperature of from 40 to 90° C., step (c): a step of producing a copolymer of ethylene having an α-olefin content of from 0.7 to 15 wt %, and an intrinsic viscosity [η] of from 0.2 to 1.0 m³/kg, at a temperature of from 30 to 80° C., in an optional order, by using a catalyst which comprises a solid catalyst component (F) containing a metallocene compound and an aluminoxane, and an organic aluminum compound, wherein the three-step polymerization is carried out so that the ratio of amount of polymerized polymers in steps (b) and (c) becomes step (b):step (c)=from 10:1 to 1:5 (weight ratio), to produce a resin composition having an intrinsic viscosity [η] of from 0.17 to 0.4 m$^3$/kg and a density of from 935 to 968 kg/m$^3$.

5. The process for producing resin composition comprising ethylene-based polymers according to claim 4, wherein the solid catalyst component (F) is a composite solid formed by contacting a solid carrier with aluminoxane and a metallocene compound stepwise or all at once.

6. The process for producing resin composition comprising ethylene-based polymers according to claim 3, wherein the solid catalyst component (E) is subjected to preliminary polymerization in the presence of an olefin.

7. The process for producing resin composition comprising ethylene-based polymers according to claim 4, wherein the solid catalyst component (F) is subjected to preliminary polymerization in the presence of an olefin.

* * * * *